Nov. 7, 1961

C. M. CAMPBELL, JR 3,008,057

BISTABLE CIRCUITS

Filed Oct. 14, 1958

| BINARY | VOLTS |
|---|---|
| 1 | 0 |
| 0 | -6 |

*INVENTOR.*

CARL M. CAMPBELL, JR.

*BY* Edward W. Hughes

ATTORNEY 3,008,057

BISTABLE CIRCUITS

Carl M. Campbell, Jr., Bryn Mawr, Pa., assignor to Burroughs Corporation, Detroit, Mich., a corporation of Michigan Filed Oct. 14, 1958, Ser. No. 767,151
7 Claims. (Cl. 307—88.5)

This invention relates to bistable circuits, or flip flops, and more particularly to flip flops especially suitable for use with switching networks formed by cascading diode gates.

The diode gates of switching networks are sometimes referred to as logic circuits since they are mechanizations of, or the functional equivalent of, symbolic logic "and" and "or" functions. The input signals for such switching networks are usually derived from bistable circuits, or flip flops, and the output signal of a switching network is generally applied to another flip flop to put it in a given one of its two stable states. When a switching network is formed by cascading diode gates, there is a rapid decrease in the amount of current flowing through each of the successive gates which limits the number of diode gates that may be successfully connected in cascade. One method of solving the problem of current decay in switching networks formed from a plurality of diode gates is to provide amplifying circuits between gates. These amplifying circuits perform no other function, and they do have the disadvantage of introducing time delays and of increasing the number of components of the switching network.

An evaluation of typical computer switching networks using voltage levels to represent information produced the following conclusions. In most applications, there are seldom more than four gates in cascade between the output terminal of one flip flop and the input terminal of another flip flop. Flip flops are generally set; i.e., placed in one of their two stable states, through the cascaded gates of a switching network; but they are usually reset; i.e., placed in the other of their two stable states, by other means generally in conjunction with a group of similar flip flops. Only one of the two output terminals with which conventional flip flops are provided is generally used as an output terminal, and the output terminal of a flip flop which is used is almost always connected to the input terminal of an "and" gate.

From the foregoing, it appears that having a large input or output current capability is the most important characteristic of an idealized flip flop for use with diode gates, because if the current capability is sufficiently large, intermediate amplifying stages between the gates of most switching networks can be omitted. When the most positive signal level is denoted "1," the largest amount of current that flows through the flip flop is that flowing from an "and" gate into the flip flop when the signal level at the output terminal of the flip flop is at its most negative value. Thus the maximum current capability should exist when the output terminal of the flip flop is at its minimum voltage level. Other desired characteristics are that the flip flop should require a minimum amount of current in order to place it in a desired stable state; and a flip flop need not have more than one output terminal.

It is therefore an object of this invention to provide an improved bistable circuit.

It is another object of this invention to provide an asymmetrical flip flop.

It is still another object of this invention to provide an asymmetrical flip flop which has large current handling capabilities.

It is a further object of this invention to provide a flip flop in which the current gain is maximized.

It is still a further object of this invention to provide a flip flop which has high current gain, good input discrimination, voltage regeneration, and good transient response over a wide range of temperatures.

It is still a further object of this invention to provide a reliable flip flop formed from relatively few components.

It is still another object of this invention to provide a flip flop which, in conjunction with diode gates, increases the packing density of, or minimizes the volume occupied by, such circuits.

Other objects and many of the attendant advantages of this invention will be readily appreciated as the same become better understood by reference to the following detailed description when considered in connection with the accompanying drawing wherein.

Figures 1, 2:
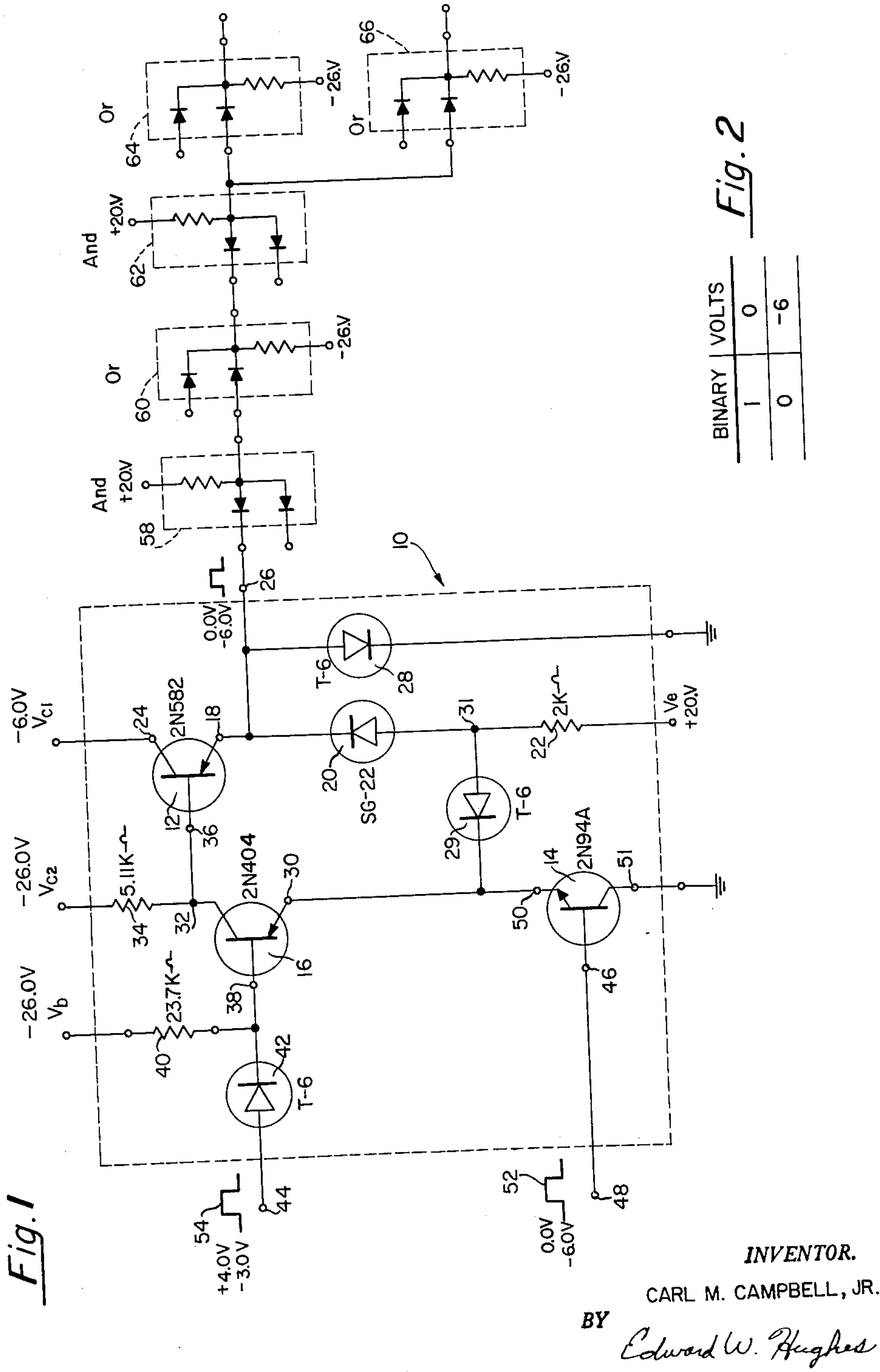
FIG. 1 is a schematic diagram of an asymmetrical flip flop and a switching network formed by cascading diode logic circuits.
FIG. 2 is a chart showing the relationship between the output voltages of the asymmetrical flip flop and binary digits.

Asymmetrical flip flop 10 is comprised of three electronic amplifiers, preferably semiconductor amplifying devices of the type generally identified as transistors. They are output transistor 12, set transistor 14 and reset transistor 16. In FIG. 1, transistors 12 and 16 are illustrated as being "pnp" transistors, and transistor 14 is illustrated as being an "npn" transistor. The emitter 18 of output transistor 12 is connected through voltage reference diode 20 and emitter resistor 22 to a suitable source of emitter potential $V_e$, which is not illustrated. Voltage reference diode 20 is a unilateral conducting device, normally made of silicon, which has a substantially uniform voltage drop across it in the forward direction even though the amount of current passing through it varies substantially. A diode having these characteristics is the SG–22 which is manufactured by the Transitron Electronic Corp., Wakefield, Mass. Collector 24 of transistor 12 is directly connected to a suitable source of collector potential $V_{c1}$, which is not illustrated. Output terminal 26 of flip flop 10 is directly connected to the emitter 18 of transistor 12. The circuit including transistor 12, voltage reference diode 20, and emitter resistor 22, is one having current gain but no voltage gain; and when the active element of the circuit is a semiconductor amplifier, or transistor, it is an emitter follower circuit. Emitter 18 and output terminal 26 are connected by diode 28 to a point at reference, or ground, potential and thus provides an upper limit to the voltage of these terminals; or diode 28 is an element of a clamping circuit which clamps the maximum voltage of output terminal 26 substantially to "0" volt.

By definition, a flip flop is a circuit which has two stable states. One of the stable states of flip flop 10 occurs, or exists, when output transistor 12 is cut off. The other stable state occurs when transistor 12 is conducting. The means for converting the emitter follower circuit, including transistor 12 into a bistable circuit, is a feedback circuit which is comprised of feedback diode 29 and reset transistor 16. The emitter 30 of transistor 16 is connected to the cathode of diode 29. The anode of feedback diode 29 is connected to terminal 31, which is between the anode of voltage reference diode 20 and one terminal of emitter resistor 22. Collector 32 of transistor 16 is connected through collector resistor 34 to a suitable source of collector potential $V_{c2}$, and is directly connected to the base 36 of output transistor 12, the input terminal of the emitter follower circuit which includes transistor 12.

Base 38 of transistor 16 is connected through base resistor 40 to a suitable source of base potential $V_b$, and through reset diode 42 to reset terminal 44. Base 46 of set transistor 14 is directly connected to the set terminal 48 of flip flop 10. Emitter 50 of transistor 14 is directly connected to emitter 30 of reset transistor 16, and collector 51 of transistor 14 is connected to ground. Transistor 14 is the active element of an emitter follower circuit in which the emitter load is primarily provided by reset transistor 16 and collector resistor 34.

In FIG. 2, a relationship between the output voltages of flip flop 10 at output terminal 26 for each of the two stable states of flip flop 10 and binary digits "0" and "1" is established. The voltage values and polarities are, of course, those obtained with flip flop 10 as illustrated in FIG. 1 having the values and/or types of components illustrated with applied voltages of the magnitude and polarities indicated.

The practice has become established, in the art, of designating one output terminal of a flip flop having two output terminals, as the "1" terminal and the other terminal as the "0" terminal. When the voltage at the "1" terminal is at the voltage level denoted "1," the flip flop is in its stable state designated "1." When the "0" terminal is at the "1" voltage level, the flip flop is in its other or "0" stable state. When the flip flop is in its "0" state, its "1" terminal would be at the "0" voltage level. The term "set" has the meaning of placing a flip flop in its "1" state, and the terminal to which a signal is applied to place a flip flop in its "1" state is identified as the "set" terminal. The meaning of "reset" is the converse of that of "set," since it means to place a flip flop in its "0" state. The terminal to which a signal is applied to place a flip flop in its "0" state is also known as the reset terminal.

Flip flop 10 has only one output terminal 26, and flip flop 10 will be defined as being in its "1" stable state when its output terminal 26 is at its more positive value; i.e., 0.0 volt; and as being in its "0" state when terminal 26 is at its more negative value, substantially −6 volts. In the description of the operation of flip flop 10 that follows, it will be shown that the application of a set pulse 52 to set terminal 46 will place flip flop 10 in its "1" stable state, and the application of a reset pulse 54 to reset terminal 44 will place flip flop 10 in its "0" state.

If it is assumed initially that flip flop 10 is in its stable state "1," in which output transistor 12 is biased off, then output terminal 26 will be substantially at 0.0 volt because clamp diode 28 will prevent terminal 26 from going above 0.0 volt. In the absence of either a set pulse 52 or a reset pulse 54, terminal 44 will be at −3.0 volts and set terminal 48 will be less than −3.0 volts but not lower than −6.0 volts. Terminal 31 will be more positive than terminal 26 by an amount equal to the voltage drop across voltage reference diode 20. In the circuit illustrated, terminal 31 will have a potential of substantially +0.7 volt. The initial voltage difference between terminal 31 and base 38 of transistor 16, approximately 3.7 volts, is sufficient to forward bias feedback diode 29 and the emitter to base junction of transistor 16, so that transistor 16 will be heavily biased on, or saturated. The potential of emitter 50 of set transistor 14 will be only slightly below the potential of terminal 31. Therefore, the emitter to base junction of transistor 14 will be reverse biased, and transistor 14 will be cut off. The voltage drop across voltage reference diode 20 is greater than that across feedback diode 29 and that from the emitter to collector of transistor 16 when transistor 16 is conducting heavily, or is saturated. Therefore, the base 36 of output transistor 12 is positive with respect to its emitter 18 so that the base to emitter junction of transistor 12 is reverse biased and transistor 12 is, and will be, biased off until a reset pulse is applied to reset terminal 44.

When reset pulse 54 is applied to reset terminal 44, it raises the potential of base 38 of reset transistor 16 so that transistor 16 is biased off. The potential of collector 32 of reset transistor 16 and the base 36 of output transistor 12 go negative, which biases on transistor 12.

The lower limit of the potential of base 36 will be substantially equal to the magnitude of $V_{c1}$, at which voltage the collector to base junction of transistor 12 will become forward biased. Emitter 18 will also drop substantially to the value of $V_{c1}$, substantially −6 volts, in the circuit illustrated because of the low emitter to collector impedance of transistor 12 when it is conducting heavily, or is saturated. The potential of terminal 31 will be about −5.0 volts, approximately 1 volt more positive than output terminal 26, so that the base to emitter junction of reset transistor 16 and feedback diode 29 will both be reverse biased even after reset pulse 54 terminates. As a result, transistor 12 will remain conducting until a set pulse is applied to set terminal 48. It should be noted that the change of state of flip flop 10 is initiated by the leading edge of reset pulse 54, and that once transistor 12 is conducting heavily, or flip flop 10 is in its "0" state, flip flop 10 will remain in this state irrespective of the pulse width of pulse 54.

If flip flop 10 is in its "0" state with output transistor 12 conducting heavily, and then a set pulse 52 is applied to set terminal 48, pulse 52 will forward bias the emitter to base junction of transistor 14, causing set transistor 14 to conduct. This raises the potential of emitter 30 of reset transistor 16 substantially to ground potential, which forward biases the base to emitter junction of reset transistor 16 so that it quickly saturates. Current flow through transistor 16 raises the potential of collector 32 and base 36 of transistor 12 so that transistor 12 will be biased off. As soon as transistor 12 is cut off, the potential of its emitter 18 and output terminal increases substantially to ground. The potential of terminal 31, +0.7 volt, is sufficiently positive to forward bias feedback diode 29 and the emitter to base junction of transistor 16. Reset diode 42 permits base 38 to go as positive as necessary to maintain transistor 16 saturated. The voltage drop across voltage reference diode 20 is greater than that across diode 29 and that from the emitter to collector of transistor 16, so that output transistor 12 is, and remains, biased off and flip flop 10 remains in its "1" state. It should be noted that the leading edge of set pulse 52 initiates the change of state of flip flop 10. Once transistor 12 is cut off, the feedback circuit, including voltage reference diode 20, diode 29 and reset transistor 16 will maintain output transistor 12 cut off irrespective of the width of set pulse 52. Set transistor 14, since it is operating in the emitter follower configuration, represents a relatively high impedance to set pulses 52, and produces high current gain with no voltage gain. Feedback diode 29 isolates the emitter circuit of output transistor 12, which is necessary in order to raise the potential of emitter 30 of transistor 16 above that of reset terminal 44, an essential step in biasing off output transistor 12.

If a set pulse 52 and a reset pulse 54 are simultaneously applied to terminals 48, 44, respectively, the reset pulse will predominate and flip flop 10 will either remain in its "0" state with transistor 12 conducting or it will change to its "0" state. The reason for this is that the peak voltages of reset pulses 54, +4.0 volts, exceed the peak voltages of set pulses 52, 0.0 volt, so that the emitter to base junctions of transistors 14, 16, will be reverse biased. The predominance of the reset pulses over simultaneously applied set pulses makes it possible to prevent, or inhibit, flip flop 10 from switching to its "1" state.

The asymmetrical flip flop of this invention having the values and/or components of the types indicated with the supply voltages of the magnitude placed on the drawing has a capability of handling a current of 50 milliamperes where the maximum current will flow when the potential of output terminal 26 is at −6 volts. A conservative value for the minimum magnitude of the set current to reliably place the flip flop in its one stable state is .5 milliampere. Flip flop 10 thus has a current gain from its set input terminal 48 to its output terminal 26 of substantially 100. The high current gain of flip flop 10 makes it possible to eliminate amplifying circuits between gates of most switching networks.

Output terminal 26 of flip flop 10 is shown connected to a switching network formed by cascading a plurality of "and" and "or" diode gates 58, 60, 62, 64, 66. Output terminal 26 is connected to one input terminal of "and" gate 58. The output terminal of gate 58 is connected to one of the input terminals of "or" gate 60, etc. The output terminals of gates 64, 66, are intended to be connected to the set terminals of flip flops of similar construction and having similar values and operating conditions as flip flop 10. In a computer, the other input terminals of gates 58, 60, 62, 64, 66, would be connected either to the output terminal of a flip flop similar to flip flop 10 or to the output terminal of a preceding diode gate.

The amount of current that flows through each diode gate 58, 60, 62, 64, 66, decreases rapidly from the first gate to the last gates in a switching network, such as is illustrated. One of the main reasons for this is that the magnitudes of the voltage and gate resistors are finite, and only roughly approximate a constant current source. Other causes are the unavoidable variations in the values of the gate resistors, the magnitudes of the voltages supplied to the gates, and the variable magnitudes of the voltage drops across diodes. Where two or more gates are connected in parallel to the output terminal of a preceding gate, such as gates 64 and 66, it can be readily seen that the amount of current will decrease even more rapidly than when there is no such connection, or fan out.

Base resistor 40 has a relatively large resistance and the source of base potential $V_b$ has a relatively large magnitude so that the two together roughly approximate a constant current source. In the absence of a reset pulse, reset terminal 44 will be maintained at a potential of substantially −3.0 volts, which is the average of the maximum and minimum values of set pulses 52. As long as reset terminal 44 is more positive than emitter 30 of reset transistor 16, substantially all the current for the current generator will flow through reset diode 42. When emitter 30 goes more positive than reset terminal 44, the emitter to base junction of reset transistor 16 will be forward biased and the current for the current generator will flow through transistor 16. The minimum value for a set pulse 52 is that which will cause emitter 30 to go more positive than reset terminal 44. In the circuit illustrated, this is slightly more positive than −3.0 volts. Any signal having an amplitude of less than −3.0 volts will not be effective to cause flip flop 10 to change to its "1" state. Thus, even though there may be some voltage loss through the cascaded diode gates, the flop flop 10 is able to distinguish between a "one" and a "zero" even though the voltage levels representing each binary digit have degenerated. As a result, flip flop 10 provides good input signal discrimination and does not require precise maintenance of the signal amplitudes at its set input terminal 48. Even though the input signal 52 to the set terminal may have degenerated from the desired values, nevertheless the voltage levels at output terminal 26 are standardized. Thus flip flop 10 also has voltage regeneration characteristics.

Transistors 12 and 16 are operated in saturation or cut off. The effects of hole storage are minimized by always driving these transistors out of saturation by an application through a low impedance source of relatively positive voltages to their bases since they are pnp transistors. It appears that the "turn on" times of transistors 12 and 16, rather than their hole storage delay characteristics, control the transient response characteristics of the circuit. If two transistors with identical "turn on" times but different hole storage delays are used in the circuit, there is little difference in the operation of the circuit. Since the transistors 12 and 16 are operated, saturated, or cut off, heat dissipation within the transistors is not a problem. Further, there is no significant change of transient response when temperature approaches the maximum permitted for germanium transistors.

There are a few occasions where it is desirable to invert the output signal of asymmetrical flip flop 10 before applying the signal to a network of cascaded diode gates. This is referred to in the art as providing a "zero" output, or using the "zero" output terminal of the flip flop as the source of the output signal. A "zero" output can be obtained with the asymmetrical flip flop by a conventional inverter amplifying circuit between the output terminal 26 and the input terminal of gate 58, as is well known in the art.

The values and/or types of components and the voltages appearing on the drawings are included by way of example only, as being suitable for the devices illustrated. It is to be understood that circuit specifications in accordance with the invention may vary with the design for any particular application.

As is well known in the art, the types of transistors, i.e., pnp, npn, can be reversed provided the polarities of the supply voltages, and polarity of input signals and the diodes are reversed.

Obviously many modifications and variations of the present invention are possible in the light of the above teachings. It is, therefore, to be understood that within the scope of the appended claims, the invention may be practiced other than as specifically described and illustrated.

What is claimed is:

1. A bistable circuit comprising: a current amplifying circuit means including a first electronic amplifier device, said amplifying circuit means having an input terminal and an output terminal; a second electronic amplifier device, the state of conduction of said second amplifier device determining the state of conduction of said first amplifier device, said second amplifier device being operatively connected to be pulsed from a source of first-type pulses and being responsive to each of said first-type pulses for causing said first electronic amplifier device to be conductive; feedback circuit means including said second amplifier device, a feedback diode, and a voltage reference diode connected for feeding back electrical energy from the output terminal of said amplifying circuit to the input terminal thereof; said feedback circuit means responding to the conductive condition of said first amplifier device by sustaining the conduction thereof subsequent to the termination of a first-type pulse; circuit means including a third electronic amplifier device, said third electronic amplifier device being operatively connected to be pulsed from a source of second-type pulses and being responsive to each of said second-type pulses for causing said second electronic amplifier device to be conductive; the initiation of the conduction of said second amplifier device by a said second-type pulse causing said first amplifier device to assume a nonconductive condition; said feedback circuit means responding to the nonconductive condition of said first amplifier device by sustaining the nonconduction thereof subsequent to the termination of a second-type pulse.

2. A bistable circuit comprising: an emitter-follower amplifying circuit having a first semiconductor amplifier device, an input terminal, and an output terminal; clamp circuit means for providing a limit in one direction to the amplitude of the voltage appearing on said output terminal; a second semiconductor amplifier device, the state of conduction of said second semiconductor amplifier determining the state of conduction of said first semiconductor amplifier, said semiconductor amplifier being operatively connected to be pulsed from a source of first-type pulses and being responsive to each of said first-type pulses for causing said first semiconductor amplifier device to be biased "on"; feedback circuit means including said second semiconductor amplifier, a feedback diode, and a voltage reference diode connected for feeding back electrical energy from the output terminal of said amplifying circuit to the input terminal thereof; said feedback circuit means responding to the "on" condition of said first amplifier device by sustaining the conduction thereof subsequent to the termination of a first-type pulse; circuit means including a third semiconductor amplifier device, said third semiconductor amplifier device being operatively connected to be pulsed from a source of second-type pulses and being responsive to each of said second-type pulses for causing said second semiconductor amplifier device to be biased "on"; the initiation of the conduction of said second semiconductor amplifier by a said second-type pulse causing said first semiconductor amplifier to be biased "off" said feedback circuit means responding to the "off" condition of said first amplifier device by sustaining the nonconduction thereof subsequent to the termination of a second-type pulse; the simultaneous reception of said first- and second-type pulses respectively by said second and said third semiconductor amplifier devices causing said first semiconductor amplifier device to become conductive, or to remain conductive.

3. A bistable circuit comprising: an emitter-follower amplifying circuit comprising a first semiconductor amplifier device having an emitter, a collector and a base electrode; said base electrode serving as the input terminal for said amplifying circuit and said emitter electrode serving as the output terminal for said amplifying circuit; a second semiconductor amplifier device having an emitter, a collector and a base electrode; the state of conduction of said second semiconductor amplifier determining the state of conduction of said first semiconductor amplifier, said second semiconductor amplifier being operatively connected to be pulsed from a source of first-type pulses of a given polarity and being responsive to each of said first-type pulses for causing the emitter-to-base junction of said first semiconductor amplifier device to be forward-biased; feedback circuit means including said second semiconductor amplifier, a feedback diode, and a voltage reference diode connected between the output terminal of said amplifying circuit and the input terminal thereof; said feedback circuit responding to the forward-biasing of said first amplifier device by sustaining the forward-bias thereon subsequent to the termination of a first-type pulse; circuit means including a third semiconductor amplifier device having an emitter, a collector and a base electrode; circuit means connecting the emitter electrode of said third semiconductor amplifier to the emitter electrode of said second semiconductor amplifier, said third semiconductor amplifier device being operatively connected to be pulsed from a source of second-type pulses of the same polarity as said first-type pulses, said third semiconductor amplifier device being responsive to each of said second-type pulses for causing the emitter-to-base junction of said second amplifier device to be forward-biased; the forward-biasing of said second semiconductor amplifier by a said second-type pulse causing said first semiconductor amplifier to be reverse-biased; said feedback circuit means responding to the reverse-biasing of said first amplifier device by sustaining the reverse-bias thereon subsequent to the termination of a second-type pulse.

4. A bistable circuit comprising a first current amplifying circuit including an output semiconductor amplifier device having an emitter, base, and a collector; an output terminal for the bistable circuit; circuit means connecting said output terminal directly to the emitter of the output amplifier device; a feedback circuit including a reset semiconductor amplifier device having an emitter, a collector, and a base, a feedback diode, and a voltage reference diode connected between the base and the emitter of the output semiconductor amplifier device; a second current amplifying circuit including a set semiconductor amplifier device having an emitter, a collector and a base, circuit means connecting the emitter of the set semiconductor amplifier device to the emitter of the reset semiconductor amplifier device; said second current amplifying circuit responsive to each set pulse applied to the base of the set semiconductor amplifier device for causing the output semiconductor amplifier device to be biased off; said feedback circuit maintaining said output semiconductor amplifier device biased off; circuit means adapted to apply reset pulses to the base of the reset amplifier device; said reset amplifier device responsive to each reset pulse for causing said output semiconductor amplifier device to conduct, said feedback means maintaining said output semiconductor amplifier device conductive; the simultaneous application of said set and reset pulses resulting in said output amplifier device being, or remaining, conductive.

5. An asymmetrical flip flop comprising: an output transistor, a set transistor, and a reset transistor, each of said transistors having a base, an emitter, and a collector; an output terminal; circuit means connecting the output terminal to the emitter of the output transistor; circuit means connecting the collector of the output transistor to a first source of collector potential; a voltage reference diode and an emitter resistor connected in series between the emitter of the output transistor and a source of emitter potential; a clamping circuit for limiting the maximum value of the voltage of the output terminal substantially to reference potential; a set terminal; circuit means connecting the set terminal to the base of the set transistor; circuit means connecting the emitter of the set transistor to the emitter of the reset transistor; a feedback diode, one terminal of the feedback diode being connected to the junction between the voltage reference diode and the emitter resistor, the other terminal of the feedback diode being connected to the emitter of set transistor; a reset terminal; a reset diode connected between the reset terminal and the base of the reset transistor; a base resistor connected between the base of the reset transistor and a source of base potential; a collector resistor connected between the collector of the reset transistor and a source of collector potential; circuit means connecting the collector of the reset transistor to the base of the output transistor; the voltage drop across the voltage reference diode being greater than the voltage drop across the feedback diode and the voltage drop from emitter to collector of the reset transistor when the reset transistor is conducting heavily.

6. An asymmetrical flip flop comprising: an output transistor; a set transistor, and a reset transistor, each of said transistors having a base, an emitter, and a collector; an output terminal; circuit means connecting the output terminal to the emitter of the output transistor; circuit means adapted to directly connect the collector of the output transistor to a source of collector potential; a unilateral conductive device having a substantially constant voltage drop and an emitter resistor connected in series, one terminal of the unilateral conducting device being connected to the emitter of the output transistor, and one terminal of the emitter resistor adapted to be connected to a source of emitter potential; a clamp diode, one terminal of the clamp diode being connected to the output terminal, and the other terminal adapted to be connected to a point at reference potential; a set terminal; circuit means connecting the set terminal to the base of the set transistor; circuit means connecting the emitter of the set transistor to the emitter of the reset transistor; circuit means adapted to connect the collector of the set transistor to a point at reference potential; a feedback diode, one terminal of the feedback diode being connected between the unilateral conducting device and the emitter resistor, and the other terminal of the feedback diode being connected to the emitter of set transistor;

a reset terminal; a reset diode connected between the reset terminal and the base of the reset transistor; a base resistor, one terminal of the base resistor being connected to the base of the reset transistor, and the other terminal of the base resistor adapted to be connected to a source of base potential; a collector resistor, one terminal of the collector resistor being connected to the collector of the reset transistor, and the other terminal of the collector resistor adapted to be connected to a second source of collector potential; and circuit means connecting the collector of the reset transistor to the base of the output transistor.

7. An asymmetrical flip flop comprising: an output pnp transistor; a reset pnp transistor; and a set npn transistor; each of said transistors having a base, an emitter, and a collector; an output terminal; circuit means connecting the output terminal to the emitter of the output transistor; circuit means connecting the collector of the output transistor to a first source of negative collector potential; a first diode having a substantially uniform voltage drop across it in the forward direction; an emitter resistor; said first diode and emitter resistor being connected in series between the emitter of the output transistor and a source of positive emitter potential, said first diode being poled to conduct in the same direction as the emitter to base junction of the output transistor; a clamping circuit for limiting the maximum voltage of the output terminal, a set terminal; circuit means connecting the set terminal to the base of the set transistor; circuit means connecting emitter of the set transistor to the emitter of the reset transistor; a feedback diode, circuit means connecting the anode of the feedback diode to the junction between the first diode and the emitter resistor; circuit means connecting the cathode of the feedback diode to the emitter of the set transistor; a reset terminal; a reset diode; circuit means connecting the anode of the reset diode to the reset terminal; circuit means connecting the cathode of the reset diode to the base of the reset transistor; a base resistor; circuit means connecting one terminal of the base resistor to the base of the reset transistor; circuit means connecting the other terminal of the base resistor to a negative source of base potential; a collector resistor; circuit means connecting one terminal of the collector resistor to the collector of the reset transistor; circuit means connecting the other terminal of the collector resistor to a source of negative collector potential; and circuit means connecting collector of reset transistor to base of first transistor.

References Cited in the file of this patent

UNITED STATES PATENTS

| | | |
|---|---|---|
| 2,831,126 | Linvill et al. | Apr. 15, 1958 |
| 2,831,128 | Sumner | Apr. 15, 1958 |
| 2,848,653 | Hussey | Aug. 19, 1958 |
| 2,861,199 | Henle | Nov. 18, 1958 |
| 2,870,347 | Jensen | Jan. 20, 1959 |
| 2,875,432 | Markow | Feb. 24, 1959 |
| 2,928,011 | Campbell | Mar. 8, 1960 |